June 24, 1930. J. A. E. CARLSON 1,767,510
POWER DRIVEN LAWN MOWER
Filed July 12, 1926 4 Sheets-Sheet 1
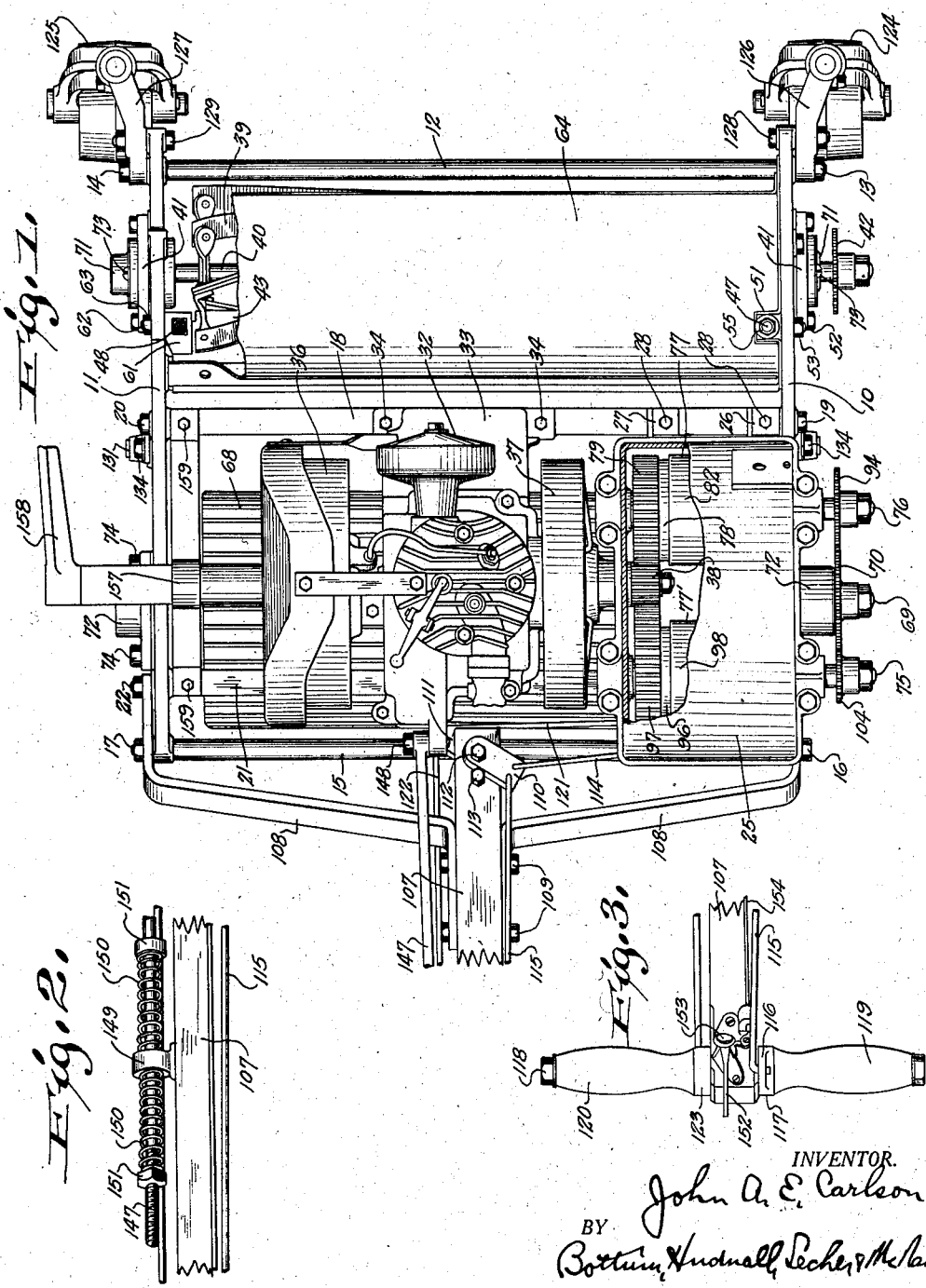
INVENTOR.
John A. E. Carlson
BY
Bottum, Hudnall, Secher & McNamara
ATTORNEYS June 24, 1930.  J. A. E. CARLSON  1,767,510
POWER DRIVEN LAWN MOWER
Filed July 12, 1926   4 Sheets-Sheet 2
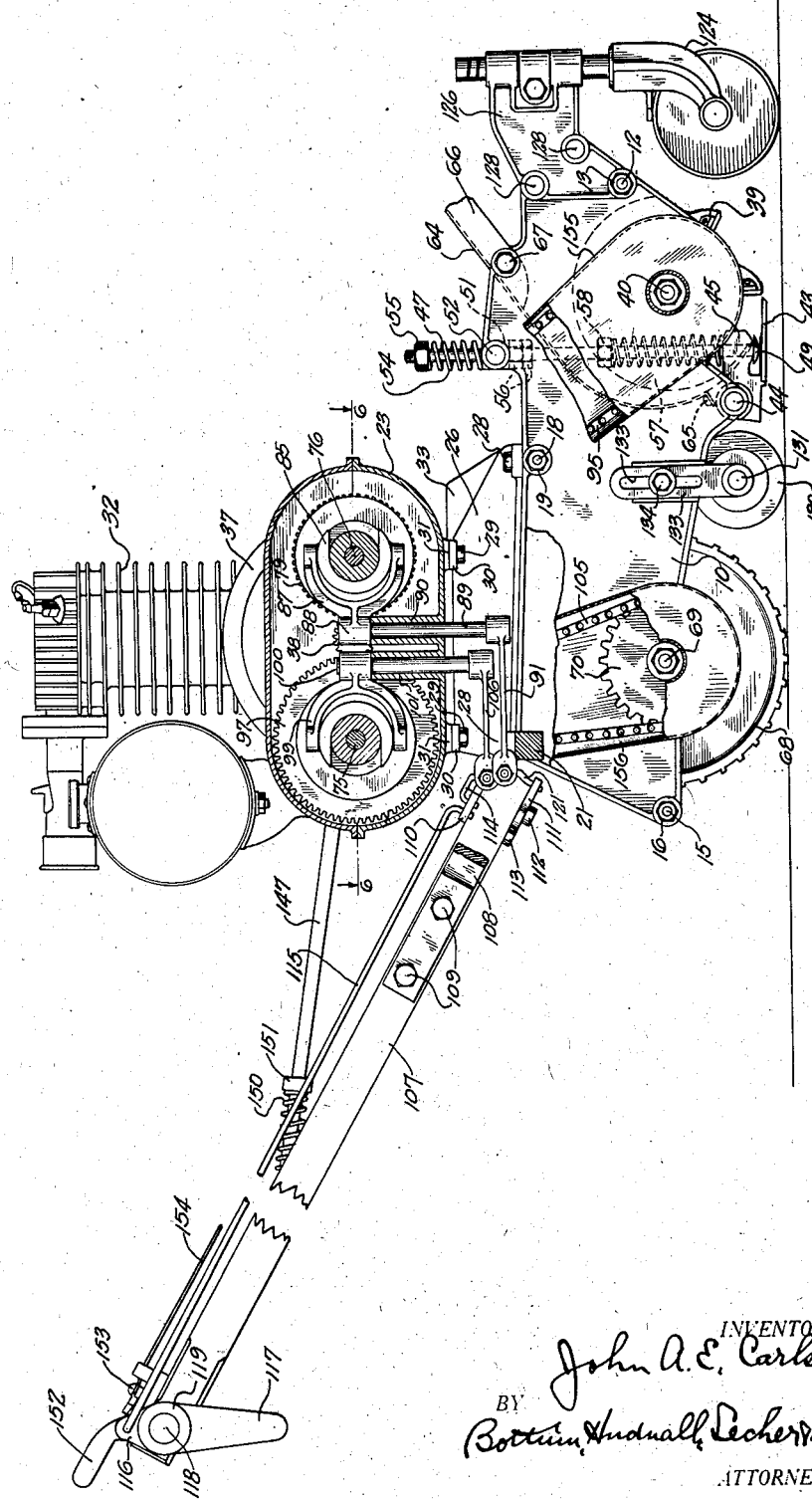

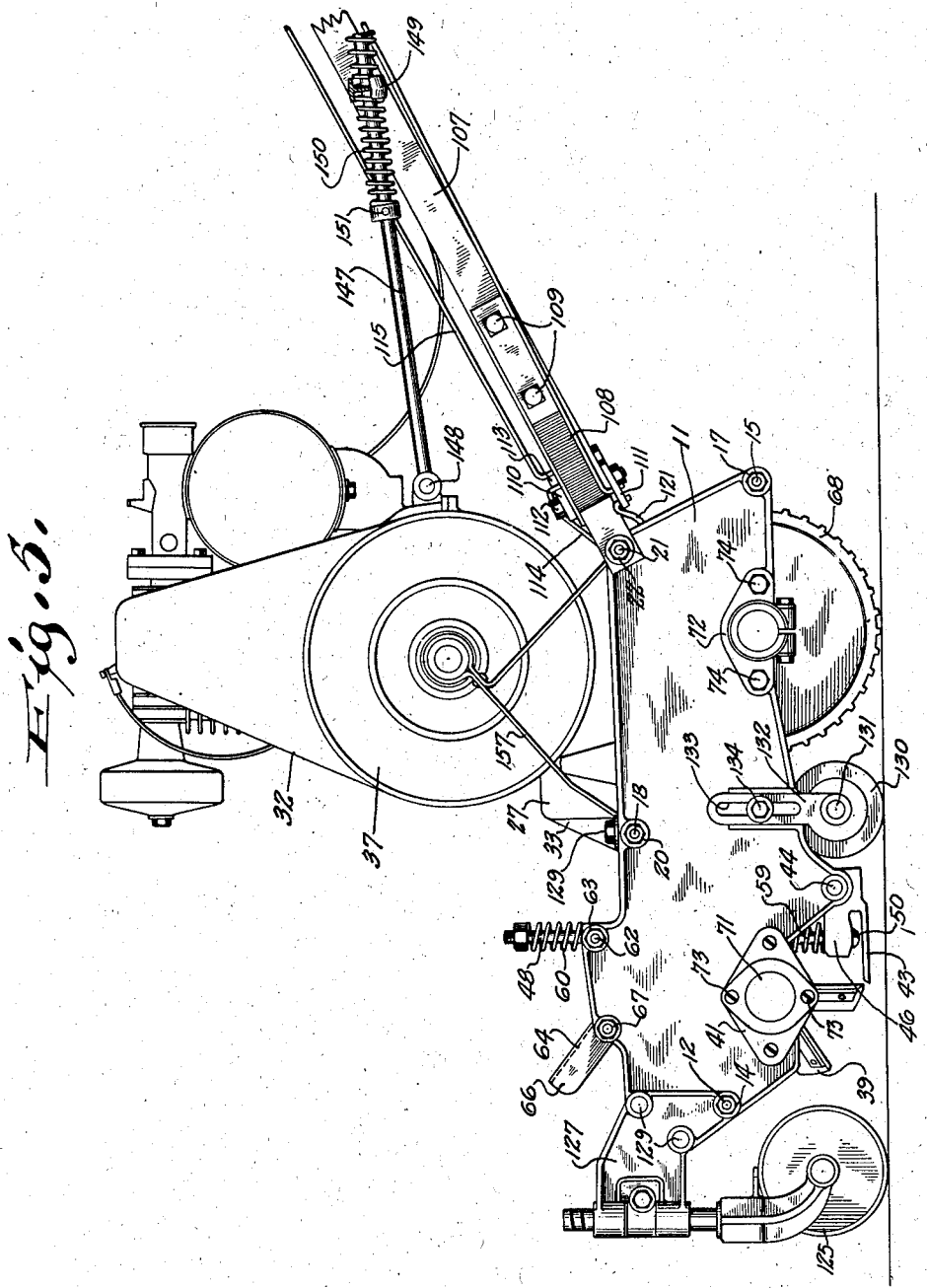

June 24, 1930. J. A. E. CARLSON 1,767,510
POWER DRIVEN LAWN MOWER
Filed July 12, 1926 4 Sheets-Sheet 4

INVENTOR.
John A. E. Carlson
BY
Bottum, Hudnall, Decker & McNamara
ATTORNEYS

Patented June 24, 1930

1,767,510

UNITED STATES PATENT OFFICE

JOHN A. E. CARLSON, OF RACINE, WISCONSIN, ASSIGNOR TO JACOBSEN MFG. CO., OF RACINE, WISCONSIN, A CORPORATION OF WISCONSIN

POWER-DRIVEN LAWN MOWER

Application filed July 12, 1926. Serial No. 121,764.

This invention relates to power driven mowers such as are used for cutting lawns.

One of the objects of the present invention is to provide an improved power mower of the character referred to with means for readily connecting and disconnecting the supporting traction means and the cutting reel or element to and from the driving motor, and wherein such means has advantages over the various constructions used heretofore as regards compactness, simplicity and ruggedness of construction, and flexibility of operation.

Other objects and advantages will hereinafter appear.

For the purpose of illustrating the invention, one embodiment thereof is shown in the drawings, in which:

Figure 1 is a plan view of a power driven lawn mower partly broken away and some of the parts being removed for the sake of clearness;

Fig. 2 is a fragmentary plan view of a portion of the handle of a mower taken from the left end;

Fig. 3 is a fragmentary plan view of another portion of the handle of the mower taken from the left end;

Fig. 4 is a side elevational view of one side of the mower, partly in section and partly broken away;

Fig. 5 is an elevational view of the other side of the mower;

Figure 6:
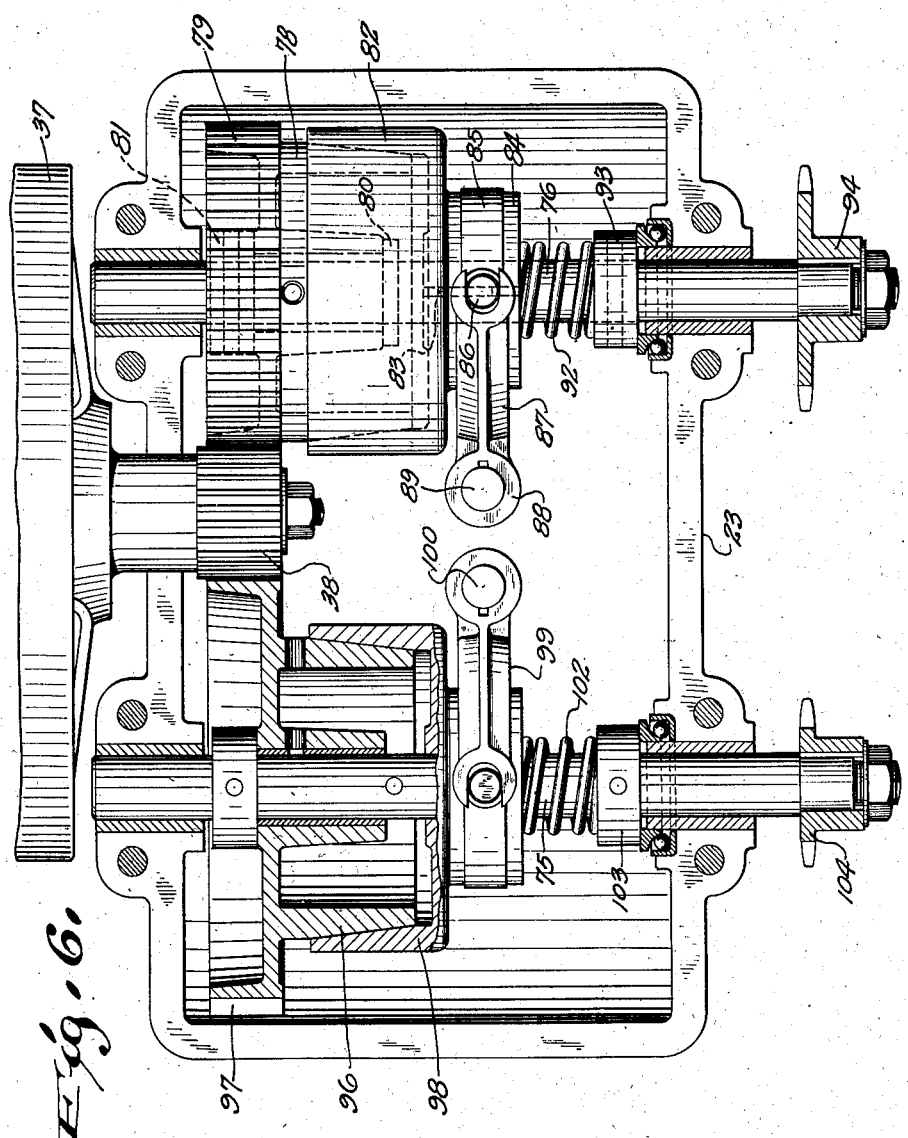
Fig. 6 is a plan view partly in section of the transmission arrangement of the mower, the section being taken on the line 6—6 in Fig. 4.

The frame of the machine includes the side frame members 10 and 11 held in fixed spaced relation with respect to each other at their forward ends by the reenforcing brace bar 12 having its ends reduced and passed through the latter and threaded to receive the fastening nuts 13 and 14, and at their rear ends by a similar reenforcing brace bar 15 having its ends reduced and passed through these ends and threaded to receive the fastening nuts 16 and 17. A cross piece 18 rectangular in cross section is arranged transversely of members 10 and 11 and has its ends reduced and passed through the latter and threaded to receive the fastening nuts 19 and 20. A similar cross piece 21 is spaced rearwardly from cross piece 18 and arranged parallel thereto, with its ends also extended through members 10 and 11 and threaded to receive the fastening nuts 22. As shown in Figures 1, 4 and 7, a pair of correspondingly shaped saddles 26 and 27 are laterally spaced with respect to each other and secured to the cross pieces 18 and 21 by means of bolts 28. A two-part transmission housing 23 is mounted on the saddles and secured thereto by bolts 29 which cooperate with spaced lugs 30 on the saddles and correspondingly spaced lugs 31 on the housing. A suitable motor, designated generally by the reference numeral 32, and which may be an internal combustion engine of any suitable construction, is arranged with its base 33 extending across the cross pieces 18 and 21 and secured thereto by bolts 34. The motor is provided with the fly wheels 36 and 37 fixed on the crank shaft thereof and has one end of the crank shaft extending through the adjacent side of casing 23, as more clearly shown in Fig. 6, and having fixed thereto a gear 38. The cutting reel 39 of usual construction is disposed between the forward ends of frame members 10 and 11 and is provided with an operating shaft 40 journaled at its ends in bearings 41 with which the frame members are provided, one end of shaft 40 extending outwardly beyond frame member 10 and carrying a sprocket wheel 42 fixed thereto adapted to be driven by the motor through a sprocket chain 95, as will be explained hereinafter.

A suitable bed knife 43 is pivotally mounted on a rod 44 supported at its ends in frame members 10 and 11. For this purpose the rod is provided at its ends with lugs 45 and 46 through which loosely pass bolts 47 and 48, respectively, the heads 49 and 50 of the bolts engaging the under sides of the lugs to hold the bed knife up in adjusted position in the manner hereinafter more fully explained. The bolt 47 extends loosely through a square lug 51 provided with a threaded stud 52 which extends through frame member 10 and receives the nut 53 for holding this lug securely to member 10. A spring 54 is arranged on bolt 47 and is held compressed between lug 51 and the nut 55 threaded on the upper end of the bolt. As more clearly shown in Fig. 4, nuts 56 are also threaded on bolt 47 and are arranged as shown to engage the under side of lug 51 to limit upward axial movement of the bolt under the action of spring 54 and to hold the latter compressed. The lug 45 is yieldingly held down against the bolt head 49 by the spring 57 arranged on the bolt and held compressed between the nut 58 threaded on the latter and the lug 45. The construction at the opposite side of the machine is identical to that just described, the compressed spring 59 corresponding to spring 57, acting to yieldingly hold lug 46 down against the bolt head 50, and the compressed spring 60, corresponding to spring 54, acting to yieldingly hold bolt 48 against downward axial movement, bolt 48 passing loosely through a square lug 61 provided with a stud 62 extending through frame member 11 and threaded to receive the nut 63. From the foregoing it will be seen that the springs 54 and 60 urge the bed knife 43 upwardly into cutting relation with the reel 39, and that by adjusting nuts 56 axially of the bolts, the relation between the edges of the bed knife and the reel blades may be varied. It will also be seen that should a stone or other obstruction enter between the cutting edges of the bed knife and reel blades, springs 54 and 60 will be further compressed and yield somewhat to permit the bed knife to give, thereby protecting the parts against strain which would otherwise occur if the bed knife were rigidly fixed. The springs 57 and 59, further, act against the respective upper sides of lugs 45 and 46 to hold the same in close engagement with the bolt heads 49 and 50 and thus act to yieldingly hold the bed knife against movement toward the reel blades from its position of adjustment and to cause the knife to follow exactly the axial adjusting movements of bolts 47 and 48. A suitable guard 64 is disposed between frame members 10 and 11 and extends downwardly and rearwardly around the reel or cutting element 39 and is secured at its lower edge to the bed knife member by the screws 65, and at its upper end by the downwardly extending side flanges 66 which are secured to the side frame members by the bolts 67. The guard acts to direct the cut grass upwardly and forwardly away from the machine.

The machine is supported by and driven forward upon rotation of the traction means or roller 68 disposed rearwardly of the cutting reel 39 and between frame members 10 and 11, and mounted on the operating shaft 69 journaled at its ends in bearings 72 secured to the side frame members by bolts 74. One end of shaft 69 extends outwardly beyond frame member 10 and has fixed thereto a sprocket wheel 70 adapted to be driven by the motor through a chain 105, as will be further described hereinafter.

Protecting caps 71 may be placed over the ends of the operating shaft 40 and secured to the side frame members by screws 73.

The transmission housing 23 contains mechanism for connecting and disconnecting the cutting reel 39 and the traction means 68 to and from the motor. This mechanism includes a pair of spaced parallel shafts 75 and 76 journaled at their respective ends in casing 23 and disposed on opposite sides of the axis of rotation of gear 38. A clutch, designated generally in Figure 1, by the reference numeral 77, is carried by shaft 76 for clutching the same to the motor driven gear 38 to drive the cutting reel. The clutch includes a male member 78 loosely mounted on shaft 76 and provided with gear 79 arranged to mesh with gear 38. This clutch member 78 is held against axial shifting along the shaft by the pin 80 extending through the shaft and engaging one end of the hub of the member and by the collar 81 fixed on the shaft and engaging the other end of the hub. The clutch includes further the female part 82 splined on shaft 76 by the key 83 and provided with the collar 84 which has an annular groove cut therein for loosely receiving a yoke 85 provided with diametrically arranged and outwardly extending trunnions 86. As shown in Figure 6, the trunnions are engaged by the bifurcated ends of the clutch actuating member 87 which is fixed upon the upper end of a pin 89 by an integral sleeve 88. The pin 89 is journaled for rotary movement in an upstanding bearing 90 which may be cast integrally with the lower part of the casing 23, as shown in Figure 4. An arm 91 is fixed on the lower end of pin 89 which extends below casing 23 and provides means for causing rotary movement of the pin to effect engagement or disengagement of the clutch parts 78 and 82. The clutch part 82 is disengaged against the action of the spring 92 arranged on the shaft 76 and held pressed between a collar 93 fixed thereon and the collar 84 of clutch part 82. It is to be noted that by reason of this construction there is no thrust against the sides of the casing when the clutch part 82 is in driving engagement with clutch part 78 under the action of spring 92, the collars 81 and 93 acting as abutments and taking all of the thrust of the spring. Upon disengagement of clutch parts 78 and 82, the shaft 76 is permitted to come to rest. As the yoke 87 is moved to cause this disengagement, the collar 93 is crowded against the adjacent side of the casing 23, since the yoke 87 is pivoted to the casing and bears upon the collar 93 through the collar 84 and spring 76. Thus, when the clutch is disengaged and the shaft 76 has come to rest, all of the thrust of the spring is taken up by the casing so that the pressure of the spring is not counteracted through any relatively movable parts. One end of shaft 76 extends outwardly beyond casing 23 and is provided with the sprocket wheel 94 fixed thereon and connected by the sprocket chain 95 to the sprocket wheel 42 of the cutting reel.

The mechanism for driving the traction roller 68 includes a clutch, designated generally in Figure 1 by the reference numeral 77′ which is identical in construction with the clutch 77 just described. The clutch 77′ thus comprises the male member 96 loosely mounted on shaft 75 and provided with the gear 97 arranged in mesh with gear 38. The female part 98 of the clutch 77′ is splined on shaft 75 and is controlled by the clutch actuating member 99 which is similar to member 87. The clutch actuating member 99 is fixed on the upper end of the pin 100 journaled for rotary movement in the upstanding bearing 101 cast integrally with lower part of casing 23. A spring 102 arranged on shaft 75 is held compressed between clutch part 98 and the fixed collar 103. One end of shaft 75 also extends outwardly beyond casing 23 and is provided with the fixed sprocket wheel 104 connected by the sprocket chain 105 to the sprocket wheel 70 fixed on the operating shaft 69 for the traction means or roller 68. A clutch operating arm 106, similar to arm 91, is fixed on the lower end of pin 100 which extends downwardly below casing 23, as shown. From the foregoing it will be seen that the clutches 77 and 77′ may be independently actuated by movement of arms 91 and 106 to connect either or both the traction means 68 and the cutting reel 39 to the motor 32 for operation thereby.

A guiding handle 107 is provided with brackets 108 secured thereto by bolts 109, the forward ends of the brackets being journaled on the reduced ends of the cross piece 21, as more clearly shown in Figs. 1 and 5. Lugs 110 and 111 are disposed on opposite sides of the handle 107 at the lower end thereof and are pivotally mounted on a bolt 112 extending through the latter, a second bolt 113 also extending through this end of handle 107 and providing a stop for members 110 and 111 for a purpose to be hereinafter explained. A rod 114 is pivotally connected at its ends to member 110 and the outer end of arm 106, the arrangement being such that member 110 and rod 114 provide a toggle mechanism operable when in its extended or dead-center position to hold clutch part 98 out of driving engagement with clutch part 96, the bolt 113 being arranged to engage member 110 when it is slightly beyond its extended or dead-center position to the left, as viewed in Fig. 1. The action of spring 102 is such as to hold the member 110 in the position shown in Fig. 1 with member 110 against the bolt or stop 113 after it has been manually moved to this position. For manually moving the member 110, a rod 115 is pivotally connected at one end to member 110 and at its other end to lug 116. The lug 116 is formed integral with a manually operable lever 117 loosely mounted on a bolt 118 which extends transversely through the upper end of handle 107 and which supports the hand grips 119 and 120 as well as a lever 123 and the lever 117 transversely thereof, and supports the hand grips 119 and 120 and lever 123 as well as the lever 117. On movement of lever 117 to the left, as viewed in Fig. 4, it will be seen that rod 115 will be placed under compression to cause movement of the toggle mechanism comprising member 110 and rod 114 past its dead-center position to the right, as viewed in Fig. 1, thereby permitting instantaneous engagement of clutch part 98 with clutch part 96 under the action of spring 102. The actuating means for lever 91 connected with clutch 77 is similar in construction and manner of operation to that just described for clutch 77′, and includes the rod 121 pivotally connected at its end to the outer end of arm 91 and lug 111 and forming with the latter a toggle mechanism, and a rod 122 pivotally connected at its ends to lug 111 and to a lever 123 similar to lever 117 and arranged loosely on bolt 118 between handle 107 and grip 120. It will thus be seen that the levers 117 and 123 constitute manually-operable means for causing independent rotary movement of pins 89 and 100 and the clutch-actuating members 87 and 99 fixed thereto, respectively. The manually-operable means just described for controlling the clutch operating arms 91 and 106 is shown more in detail and claimed in my copending application S. N. 109,491, filed May 17th, 1926.

The forward ends of the frame members 10 and 11 are provided with suitable casters 124 and 125 of any suitable construction and which are swiveled in brackets 126 and 127, respectively, fixed to the frame members by bolts 128 and 129. As indicated in Fig. 1, the reduced ends of the brace rod 12 may be passed through brackets 126 and 127 to provide further means for holding the latter in assembled relation with respect to the side frame members, the nuts 13 and 14 being tightened against these brackets. A wooden roller 130 may be arranged as shown between reel 39 and the traction means 68 and loosely mounted on a shaft or spindle 131 supported at its ends by straps 132 extending upwardly against the outer faces of frame members 10 and 11 and provided with vertical slots 133 through which pass bolts 134, these bolts passing through the side frame members and providing means for holding straps 132 in assembled relation with respect to the latter and for vertical adjustment. The roller 130 is aligned with casters 124 and the roller 68, and operates to pack down the earth and the stubs of cut grass after the cutting reel 39 has passed over the same.

For the purpose of supporting handle 107 and absorbing the vibrations which are ordinarily transmitted thereto from the motor, a rod 147 is pivotally connected at one end to the crank case of the engine by a pin 148. The other end of rod 147 is passed loosely through a lug 149 fixed to the handle and relatively stiff springs 150 are arranged between opposite sides of lug 149 and nuts 151 fixed on the rod 147. The arrangement is such that any pivotal movement of the handle about the axis of the cross piece 21 causes compression of one or the other of springs 150, the springs thereby absorbing the shocks or vibrations which would ordinarily be communicated to the handle and yieldingly holding the latter in elevated position. The construction just described is shown more in detail and claimed in my copending application referred to above.

A lever 152 may be pivotally connected to the handle at the point 153 and connected through a suitable flexible connection 154 to the carbureter of the engine for controlling the same in the well known manner.

As indicated in Fig. 4, suitable guards 155 and 156 may be placed over the operating parts extending outwardly beyond frame member 10 and secured to the latter.

A bracket 157 may be provided for receiving the crank 158 for starting the motor, the bracket being arranged transversely of cross pieces 18 and 21 and secured thereto at its ends by the bolts 159.

From the foregoing it will be seen that a power mower has been provided which is comparatively simple in construction and operation and wherein the traction means 68 and the cutting element or reel 39 may be readily connected or disconnected to and from the motor.

While but one embodiment of the invention has been shown and described, of course various changes may be made such as in the size, shape and arrangement of the parts without departing from the spirit of the invention or the scope of the claims.

The invention claimed is:

1. A power driven lawn mower including a motor, a cutting element, traction means and clutch controlled driving connections between the motor and the cutting element and the traction means, a casing enclosing the clutch controlled driving connection, each clutch controlled driving connection including a shaft mounted on said casing, a pair of clutch members mounted on the shaft, a collar fixed to the shaft and abutting one of the clutch members but spaced from the adjacent portion of the casing, a spring urging the clutch members into engagement, a collar fixed to the shaft and affording an abutment for said spring, and a thrust bearing on the casing with which said abutment collar is engageable.

2. In a power driven lawn mower, the combination of a frame having a cutting element, traction means, a motor and a transmission casing thereon, a gear in the casing connected to the motor to be driven thereby and transmission means in the casing for independently connecting the gear to the cutting element and traction means to drive the same by the motor, said transmission means consisting of two similar units, each including a shaft journaled in the casing, a clutching element splined to the shaft and a combined gear wheel and clutching element loosely mounted on the shaft and meshing with said motor driven gear.

3. In a power driven lawn mower, the combination of a frame having a cutting element, traction means, a motor and a transmission casing thereon, a gear in the casing connected to the motor to be driven thereby and transmission means in the casing for independently connecting the gear to the cutting element and traction means to drive the same by the motor, said transmission means consisting of two similar units, each including a clutch and means for actuating the clutch including a pin mounted in a bearing on the casing and disposed for rotation about an axis in a plane substantially at right angles to the axis of the shaft, and an element mounted on the pin and engaging the clutch.

4. In a power driven lawn mower, the combination of a frame having a cutting element, traction means, a motor and a transmission casing thereon, a gear in the casing connected to the motor to be driven thereby and transmission means in the casing for independently connecting the gear to the cutting element and traction means to drive the same by the motor, said transmission means consisting of two similar units, each including a shaft journaled in the casing, a clutching element splined to the shaft, a combined gear wheel and clutching elements loosely mounted on the shaft and meshing with said motor driven gear, a spring for urging the clutching elements into engaging position and means for preventing the force of the spring from exerting a thrust upon the casing when the clutching elements are in engaging position.

5. A transmission system for use with a power driven lawn mower of the type having a motor and a cutting element and traction means adapted to be driven by the motor, said system consisting of a casing, a gear in the casing adapted to be connected to the motor to be driven thereby and means in the casing for independently connecting the gear to the cutting element and traction means to drive the same by the motor, said means consisting of a plurality of like units, each including a shaft, a gear wheel loosely mounted on the shaft and meshing with said motor driven gear, and means on the shaft for clutching the gear wheel to the shaft.

In witness whereof, I hereto affix my signature.

JOHN A. E. CARLSON.